May 20, 1930.  W. E. LACEY  1,759,358

RESILIENT VEHICLE WHEEL

Filed June 17, 1929

INVENTOR
W. E. Lacey
BY
ATTORNEY

Patented May 20, 1930

1,759,358

UNITED STATES PATENT OFFICE

WILBUR E. LACEY, OF ISLETON, CALIFORNIA

RESILIENT VEHICLE WHEEL

Application filed June 17, 1929. Serial No. 371,376.

This invention relates to vehicle wheels, particularly to those of motor vehicles.

My principal object is to provide a wheel for the purpose in which the connections between the hub and the rim or felly band of the wheel are so arranged that the hub is cushion mounted relative to the felly, thus absorbing the majority of the severe shocks and vibrations incident to travel and thus making the vehicle easier riding.

A further object is to arrange such connections so that a sudden torque applied to the axle (if the wheel is a driven one), as when starting the vehicle, will be more or less absorbed or counteracted before reaching the rim and tire, thus lessening the strains on the latter and increasing the life of the same.

These objects I accomplish by means of such structure and relative arrangement of parts as will fully appear by a perusal of the following specification and claim.

In the drawings similar characters of reference indicate corresponding parts in the several views.

Figure 1:
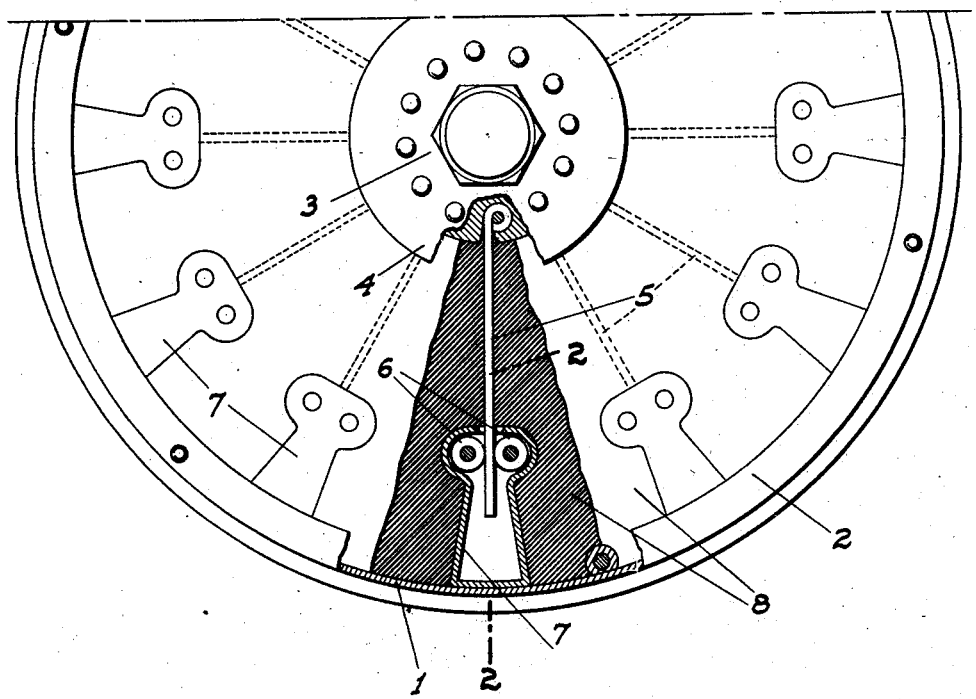
Fig. 1 is a fragmentary side elevation of a wheel partly in section showing my improved cushion mounting and spoke arrangement.
Figure 2:
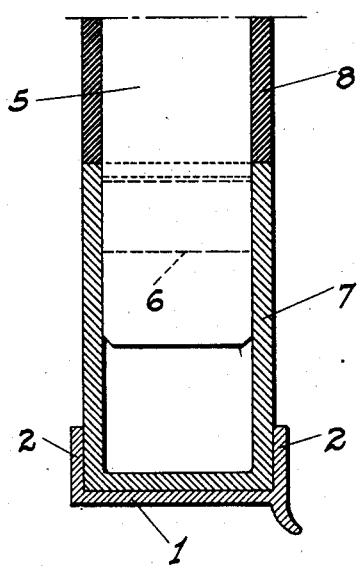
Fig. 2 is an enlarged fragmentary cross section taken on the line 2—2 of Fig. 1.

Referring now more particularly to the characters of reference on the drawings, and particularly at present to Figs. 1 and 2, the numeral 1 denotes the tire-rim engaging band or felly of the wheel which is of common form but which has continuous annular and inwardly projecting flanges 2 along its opposite edges. The hub 3 has outwardly projecting annular flanges 4 on its opposite sides spaced transversely apart the same as the flanges 2.

The spokes 5 of the wheel are in the form of flat spring strips of considerable strength disposed so that their major widths lie transversely of the wheel, and which extend from the hub to which they are secured at one end toward but terminating short of the band 1. Toward their outer ends these spokes pass between and are engaged on their wide faces by rollers 6, which are mounted in hollow housings 7 extending to and secured to the band 1 and into which the spokes slidably project. The ends or transversely disposed sides of the housings are closed in and form guides for the adjacent portions of the spokes which fit closely between such ends.

The space between the spokes for the full distance between the hub and felly band and for the full width between the hub and band flanges is filled with resilient rubber 8 of suitable character. This rubber also covers the transversely disposed edges of the spokes from the hub to the housings, since said spokes are narrower than the width between said flanges, as shown in Fig. 2. As a result of this construction it will be seen that the load is taken by the rubber filler instead of by the spokes which freely slide in the housings and merely float. The resistance of the rubber against compression is such that while the hub is normally centered with the band a sudden vertical shock will cause the hub to move vertically relative to the band, this action taking place without any binding or breaking strains being thrown on the spokes due to the flexibility of the same in the circumferential plane of the wheel and to the swivel and slidable mounting for the outer ends of the same.

The spring being only yieldable in the circumferential plane of the wheel and being rigid transversely of the wheel, and being snugly fitted between the sides of the housings there can be no lateral movement of the hub relative to the band 1, such as would cause these parts to be thrown out of proper alinement with each other.

Also due to such resiliency of the spring a sudden rotative torque or strain applied to the hub causes the flexing of the springs before such rotative strains are imparted to the band, thus reducing the placing of such sudden strains directly on the band and tire mounted thereon. At the same time undue flexing of the spring such as would tend to prevent the proper rotative effort being imparted to the band is prevented by the rubber filler in which the major portions of the spokes are embedded and which of course must be compressed when the springs flex.

Figure 3:
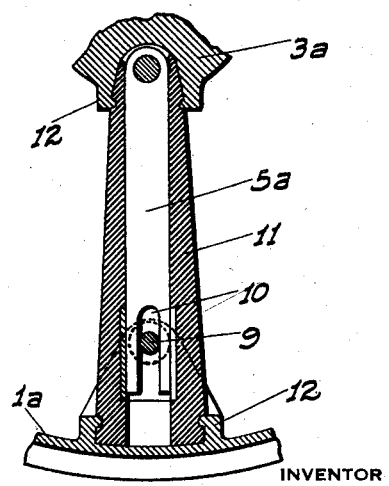
Fig. 3 is a fragmentary side section showing a modified spoke arrangement.

In the type of structure illustrated in Fig. 3 the spokes 5ª are rigid but are flexibly mounted at one end in the hub 3ª and similarly at the other end in connection with the band 1ª as by means of transversely extending pins 9 fixed in connection with said band and projecting through longitudinal slots 10. Each spoke is closely surrounded from end to end by a substantially cylindrical resilient rubber housing 11 which at its ends is secured in cups 12 provided in the hub and band. The spokes terminate short of the band as before so that the adjacent portion of the rubber housing can flex to a certain extent circumferentially of the wheel as the relative movement of the hub and band may necessitate. This arrangement therefore gives substantially the same results as will be had with the first described type but the amount of load carrying rubber being naturally considerably less in this latter type, it is only particularly adapted for use on very light vehicles.

From the foregoing description it will be readily seen that I have produced such a device as substantially fulfills the objects of the invention as set forth herein.

While this specification sets forth in detail the present and preferred construction of the device, still in practice such deviations from detail may be resorted to as do not form a departure from the spirit of the invention, as defined by the appended claim.

Having thus described my invention what I claim as new and useful and desire to secure by Letters Patent is:

A resilient vehicle wheel comprising a hub, a felly band, spokes flexibly mounted in the hub and projecting toward but not reaching the band, said spokes being resilient only in the circumferential plane of the wheel, housings projecting inwardly from and rigid with the band and into which the free ends of the spokes slidably project, a single pair of opposed rollers mounted in the housings and engaging the opposed faces of the spokes, and resilient rubber extending unbroken between the hub and band between the spokes.

In testimony whereof I affix my signature.

WILBUR E. LACEY.